US012699242B2

(12) United States Patent
Sun et al.

(10) Patent No.: US 12,699,242 B2
(45) Date of Patent: Aug. 4, 2026

(54) PHOTONIC INTEGRATED CIRCUIT CHIP

(71) Applicant: Wistron Corporation, New Taipei City (TW)

(72) Inventors: Ching Pao Sun, New Taipei City (TW); Cheng Hung Lu, New Taipei City (TW); Guan Fu Lu, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 338 days.

(21) Appl. No.: 18/494,695

(22) Filed: Oct. 25, 2023

(65) Prior Publication Data

US 2025/0085496 A1 Mar. 13, 2025

(30) Foreign Application Priority Data

Sep. 7, 2023 (TW) ................................. 112134120

(51) Int. Cl.
| | |
|---|---|
| *G02B 6/43* | (2006.01) |
| *G02B 6/42* | (2006.01) |
| *H04B 10/43* | (2013.01) |

(52) U.S. Cl.
CPC ............. *G02B 6/43* (2013.01); *G02B 6/4246* (2013.01); *H04B 10/43* (2013.01); *G02B 6/4215* (2013.01); *G02B 6/4227* (2013.01); *G02B 6/4266* (2013.01); *G02B 6/428* (2013.01)

(58) Field of Classification Search
None
See application file for complete search history.

(56) References Cited

U.S. PATENT DOCUMENTS

| | | | | |
|---|---|---|---|---|
| 10,361,787 | B2 * | 7/2019 | Mack .................... | G02B 6/4213 |
| 11,041,999 | B2 * | 6/2021 | Winzer ................ | G02B 6/4274 |
| 2011/0274438 | A1 * | 11/2011 | Fiorentino ............... | G02B 6/34 |
| | | | | 398/187 |
| 2017/0026123 | A1 * | 1/2017 | DeDobbelaere ... | H04B 10/2589 |
| 2017/0045697 | A1 * | 2/2017 | Hochberg ............. | H01S 5/0085 |
| 2018/0013494 | A1 * | 1/2018 | Young .................. | G02B 6/4213 |
| 2018/0062748 | A1 * | 3/2018 | Mack .................... | G02B 6/4213 |
| 2020/0064404 | A1 * | 2/2020 | Sugiyama ............ | G01R 31/282 |
| 2022/0045780 | A1 * | 2/2022 | Stojanovic ......... | H04Q 11/0071 |

* cited by examiner

*Primary Examiner* — Jerry Rahll
(74) *Attorney, Agent, or Firm* — JCIPRNET

(57) ABSTRACT

A photonic integrated circuit (PIC) chip has an empty area and includes a grating coupler array, a photodetector array, an optical modulator module, a plurality of optical waveguides, and a plurality of bonding pads. The photodetector array is configured to transform a light signal from the grating coupler array into an electrical signal. The optical modulator module is configured to modulate a light beam from the grating coupler array such that light with a specific wavelength in the light beam is output from the grating coupler array. The optical modulator module and the photodetector array are coupled with the grating coupler array through the optical waveguides. The bonding pads are electrically connected to the optical modulator module and the photodetector array. The grating coupler array, the photodetector array, the optical modulator module, the optical waveguides, and the bonding pads are disposed around the empty area.

20 Claims, 10 Drawing Sheets

PHOTONIC INTEGRATED CIRCUIT CHIP

CROSS-REFERENCE TO RELATED APPLICATION

This application claims the priority benefit of Taiwan application serial no. 112134120, filed on Sep. 7, 2023. The entirety of the above-mentioned patent application is hereby incorporated by reference herein and made a part of this specification.

BACKGROUND

Technical Field

The disclosure relates to an integrated circuit chip, and in particular, to a photonic integrated circuit chip.

Description of Related Art

In recent years, with the rapid growth of data transmission volume, the demand for network bandwidth and transmission speed has also increased, and the deployment of communication systems around the world continues to grow. In current optical fiber communication systems, pluggable optical fiber modules, such as SFP, QSFP, and other modules, are mainstream. Such a type of module first packages various discrete optical components to form an optical sub-assembly (OSA), and then packages the component with a printed circuit board (PCB) to form a module. The mainstream manufacturing model of such a type of module has two major bottlenecks. The module requires many components and the production process is complicated, and the optical components require a complex optical coupling system to complete the optical path connection.

The current industry trend mainly uses silicon photonics technology to solve the above bottlenecks. Silicon photonics technology utilizes the mature CMOS process of the semiconductor industry, which applies the technology of integrated circuit production to the production of micron-level optoelectronic components, and completes the connection of optoelectronic components on the chip.

However, the chip faced two problems when integrated with the PCB. First, in the configuration of modulators and pads, if there are many pads, they can become excessively concentrated. This necessitates a staggered high-low bonding approach to connect them to the PCB, increasing the risk of collisions between gold wires. Second, the spacing of modulators is too narrow, thereby resulting in different lengths of gold wires connecting the PCB high-speed lines and channels of the chip. Since the length of the gold wire affects inductance values differently, modulators of the same design exhibit performance variations based on different package designs.

In addition, in the modulator design provided by the foundry, the impedance matching circuit is not designed at the input end due to volume limitations. If there are any impedance discontinuities in the transmission path, a significant portion of the input signal energy will be reflected. This energy will continue to be reflected multiple times between the discontinuity point and the modulator, eventually leading to optical signal jitter and signal distortion.

In summary, the chip has the following problems. The components of non-silicon photonic system modules are complex and the assembly process is complex. The micro-ring modulator needs to establish a stable temperature control mechanism. When packaging chips and PCBs, the wiring density should not be too high. Impedance mismatch of micro-ring modulator component can cause test results to be less than expected.

SUMMARY

The disclosure provides a photonic integrated circuit chip, which has a better design in the layout of components and circuits.

An embodiment of the disclosure provides a photonic integrated circuit chip. The photonic integrated circuit chip has an empty area and includes a grating coupler array, a photodetector array, an optical modulator module, a plurality of optical waveguides, and a plurality of bonding pads. The grating coupler array is configured to receive a light beam and a light signal from the outside. The photodetector array is coupled to the grating coupler array for converting the light signal from the grating coupler array into an electrical signal. The optical modulator module is coupled to the grating coupler array for modulating the light beam from the grating coupler array such that light of a specific wavelength in the light beam is output from the grating coupler array. The optical modulator module and the photodetector array are coupled to the grating coupler array through the optical waveguides. The bonding pads are electrically connected to the optical modulator module and the photodetector array. The grating coupler array, the photodetector array, the optical modulator module, the optical waveguides, and the bonding pads are disposed around the empty area.

An embodiment of the disclosure provides a photonic integrated circuit chip. The photonic integrated circuit chip has an empty area and includes a grating coupler array, an optical modulator module, a plurality of optical waveguides, a plurality of heaters, and a plurality of bonding pads. The grating coupler array is configured to receive a light beam from the outside. The optical modulator module is coupled to the grating coupler array for modulating the light beam from the grating coupler array such that light of a specific wavelength in the light beam is output from the grating coupler array. The optical modulator module is coupled to the grating coupler array through the optical waveguides. The heaters are electrically connected to the optical modulator module. The bonding pads are electrically connected to the optical modulator module and the heaters. The grating coupler array, the optical modulator module, the optical waveguides, the heaters, and the bonding pads are disposed around the empty area. The optical modulator module includes a first photodetector array, an optical modulator array, and a second photodetector array. The light beam includes a first light beam and a second light beam. The first light beam is transmitted to the first photodetector array and the second light beam is transmitted to the optical modulator array. The optical modulator array receives and modulates the second light beam to generate a third light beam. The third light beam includes a fourth light beam and a fifth light beam. The fourth light beam is transmitted to the second photodetector array, and the fifth light beam is transmitted to the grating coupler array. The heaters are disposed in the optical modulator array. The bonding pads are configured to be electrically connected to a controller such that the controller obtains a light intensity of the first light beam and a light intensity of the fourth light beam. The controller controls temperature of the optical modulator array through the heaters according to the ratio between the light intensity of the fourth light beam and the light intensity of the first light beam to adjust a light intensity of the third light beam.

Based on the above, in the photonic integrated circuit chip according to an embodiment of the disclosure, the photodetector array is designed as a signal receiving end to be coupled to the grating coupler array to convert the light signal from the grating coupler array into an electrical signal; the optical modulator module is designed as a signal transmitting end to be coupled to the grating coupler array to modulate the light beam from the grating coupler array such that light of a specific wavelength in the light beam is output from the grating coupler array. Therefore, the photonic integrated circuit chip integrates the signal receiving end and the signal transmitting end into one module through a simple design.

Furthermore, in the photonic integrated circuit chip according to an embodiment of the disclosure, the controller obtains the light intensity of the first light beam from the first photodetector array and the light intensity of the fourth light beam from the second photodetector array through the bonding pad. The controller controls the temperature of the optical modulator array through the heater according to the ratio between the light intensity of the fourth light beam and the light intensity of the first light beam to adjust the light intensity of the third light beam. Therefore, the optical modulator module can form a monitoring and compensation system in conjunction with the heater, which can increase the stability of the system.

DESCRIPTION OF THE EMBODIMENTS

Figure 1A:
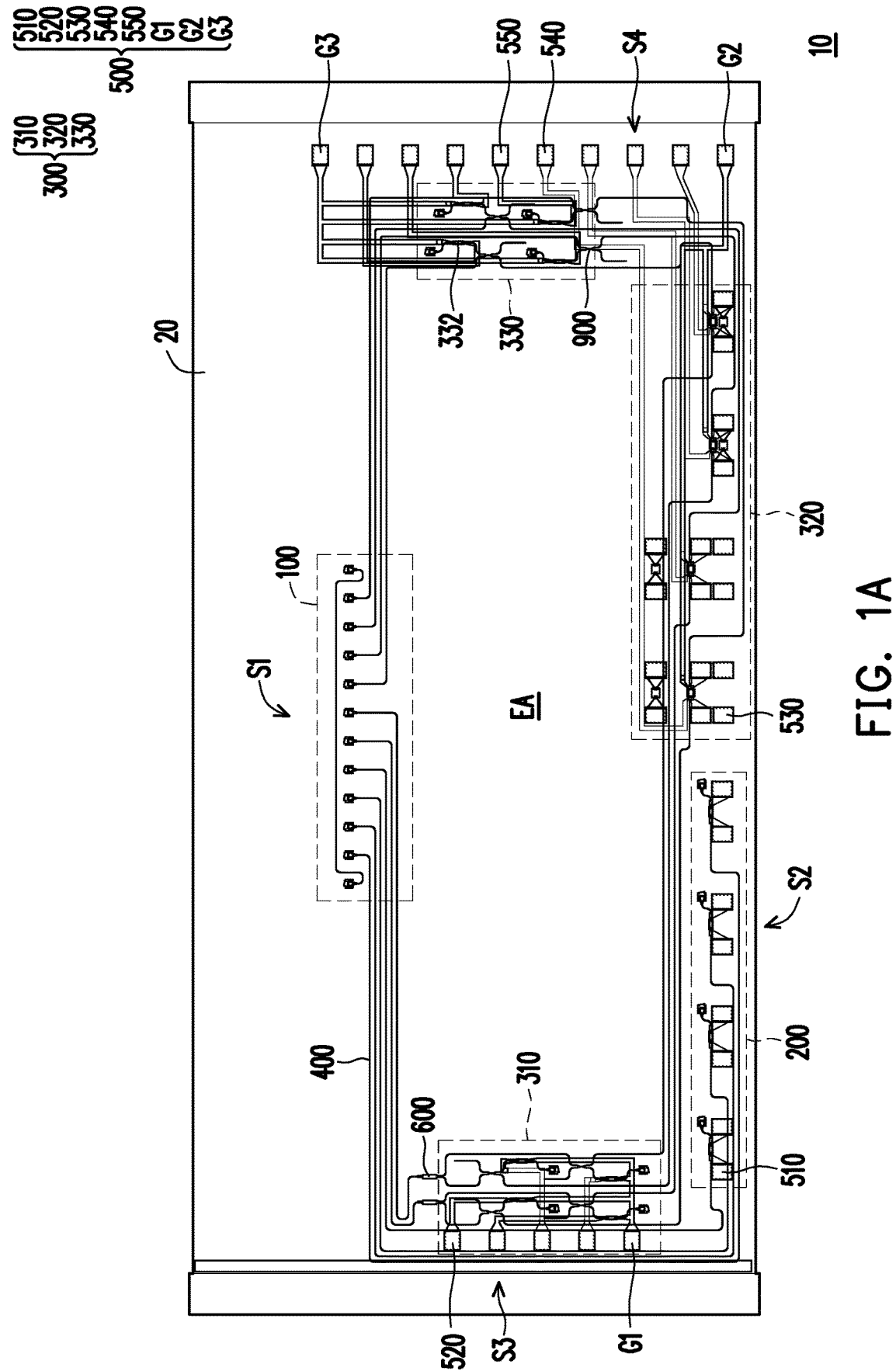
FIG. 1A is a schematic view of a photonic integrated circuit chip according to an embodiment of the disclosure.
Figure 1B:
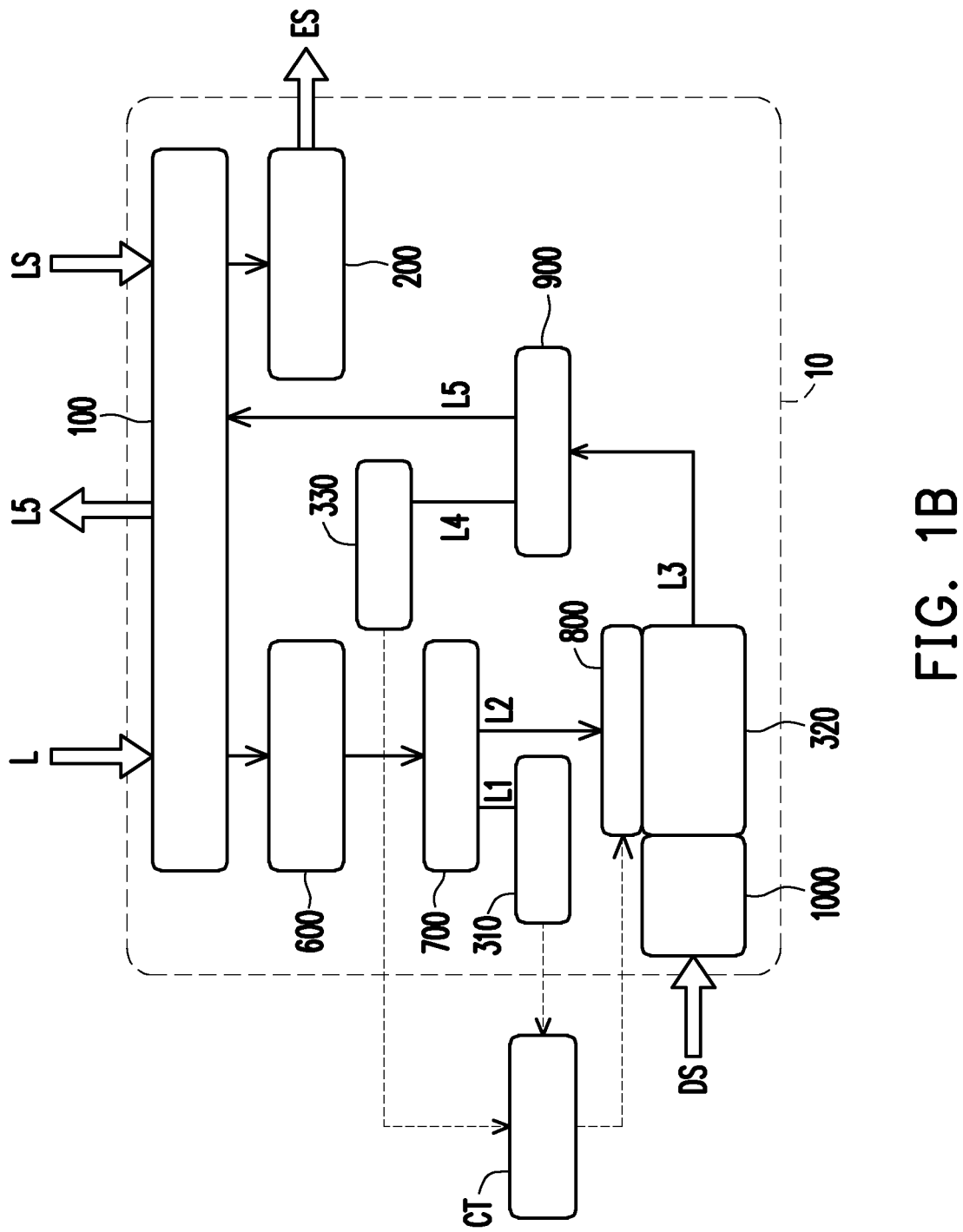
FIG. 1B is a block view of a connection relationship between various components of a photonic integrated circuit chip according to an embodiment of the disclosure.

FIG. 1A is a schematic view of a photonic integrated circuit chip according to an embodiment of the disclosure. FIG. 1B is a block view of a connection relationship between various components of a photonic integrated circuit chip according to an embodiment of the disclosure. Referring to FIG. 1A and FIG. 1B, an embodiment of the disclosure provides a photonic integrated circuit chip 10. The photonic integrated circuit chip 10 has an empty area EA, and includes a substrate 20, a grating coupler array 100, a photodetector array 200, an optical modulator module 300, a plurality of optical waveguides 400, and a plurality of bonding pads 500. The grating coupler array 100, the photodetector array 200, the optical modulator module 300, the optical waveguides 400, and the bonding pads 500 are all disposed on the substrate 20. The substrate 20 can be a circuit board, but the disclosure is not limited thereto.

In the embodiment, the grating coupler array 100 is configured to receive a light beam L and a light signal LS from the outside. The photodetector array 200 is coupled to the grating coupler array 100 for converting the light signal LS from the grating coupler array 100 into an electrical signal ES. The optical modulator module 300 is coupled to the grating coupler array 100 for modulating the light beam L from the grating coupler array 100 such that light of a specific wavelength in the light beam L (for example, a fifth light beam L5) is output from the grating coupler array 100. The optical modulator module 300 and the photodetector array 200 are coupled to the grating coupler array 100 through the optical waveguides 400. The bonding pads 500 are electrically connected to the optical modulator module 300 and the photodetector array 200. The grating coupler array 100, the photodetector array 200, the optical modulator module 300, the optical waveguides 400 and the bonding pads 500 are all disposed around the empty area EA.

Figure 2:
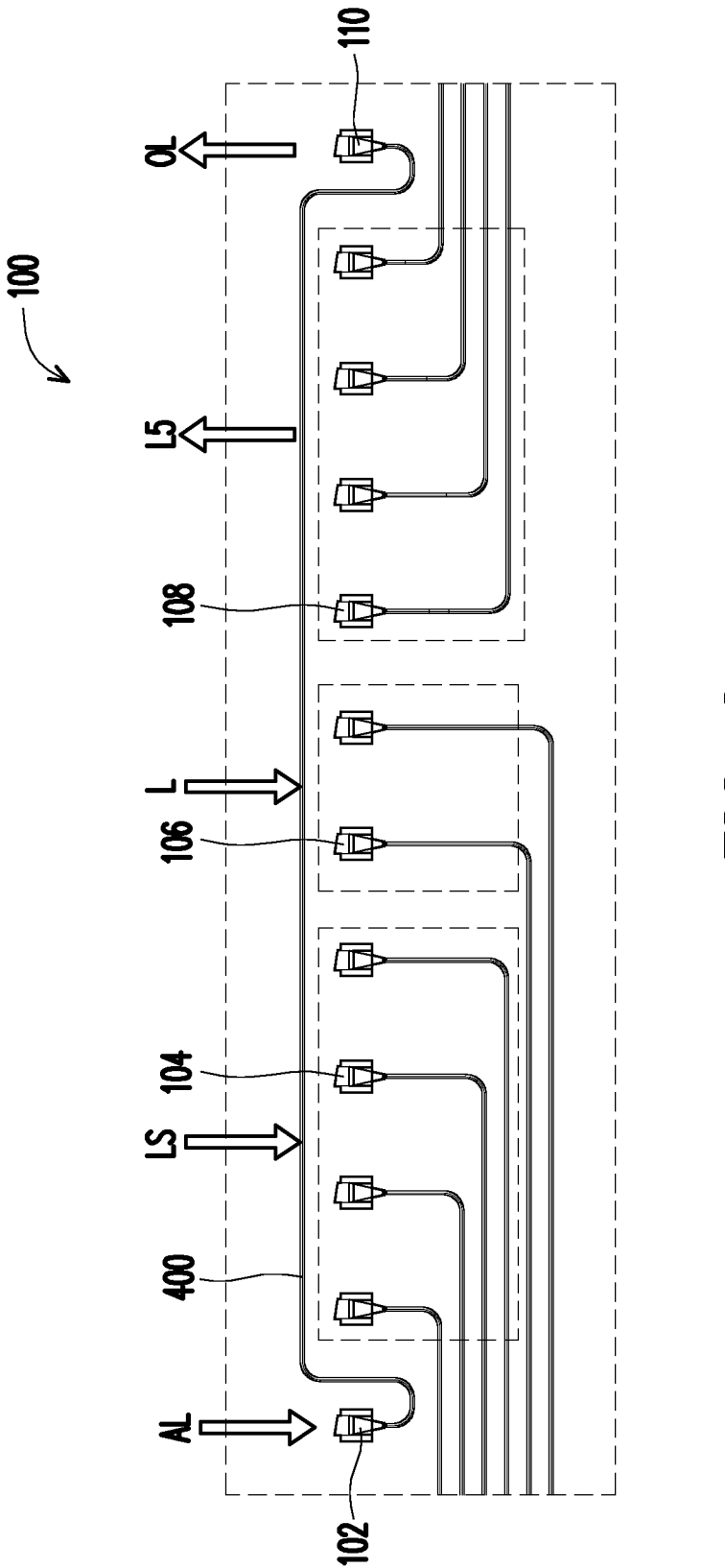
FIG. 2 is an enlarged view of the grating coupler array of FIG. 1A.

FIG. 2 is an enlarged view of the grating coupler array of FIG. 1A. Please refer to FIG. 1A and FIG. 2. Specifically, taking FIG. 1A as an example, the empty area EA has a first side S1, a second side S2, a third side S3, and a fourth side S4. The second side S2 is opposite to the first side S1. The fourth side S4 is opposite to the third side S3. The third side S3 is adjacent to the first side S1 and the second side S2, and the fourth side S4 is adjacent to the first side S1 and the second side S2.

In the embodiment, the grating coupler array 100 is disposed next to the first side S1 of the empty area EA and includes a first grating coupler 102, a plurality of second grating couplers 104, a plurality of third grating couplers 106, a plurality of fourth grating couplers 108, and a fifth grating coupler 110 sequentially arranged in an array along the first side S1. The aforementioned grating coupler is for converting the light direction from vertical to horizontal or from horizontal to vertical.

In the embodiment, the first grating coupler 102 is coupled to the fifth grating coupler 110 through one of the optical waveguides 400 to form a loopback optical path. One of the first grating coupler 102 and the fifth grating coupler 110 is configured to receive an alignment light beam AL (from the outside). The alignment light beam AL is transmitted to the other one of the first grating coupler 102 and the fifth grating coupler 110 through one of the optical waveguides 400 to generate an output light beam OL. The ratio between the output light beam OL and the alignment light beam AL determines the coupling efficiency between the optical fiber array (such as an optical fiber array FB of FIG. 8) and the grating coupler array 100.

Figure 3:
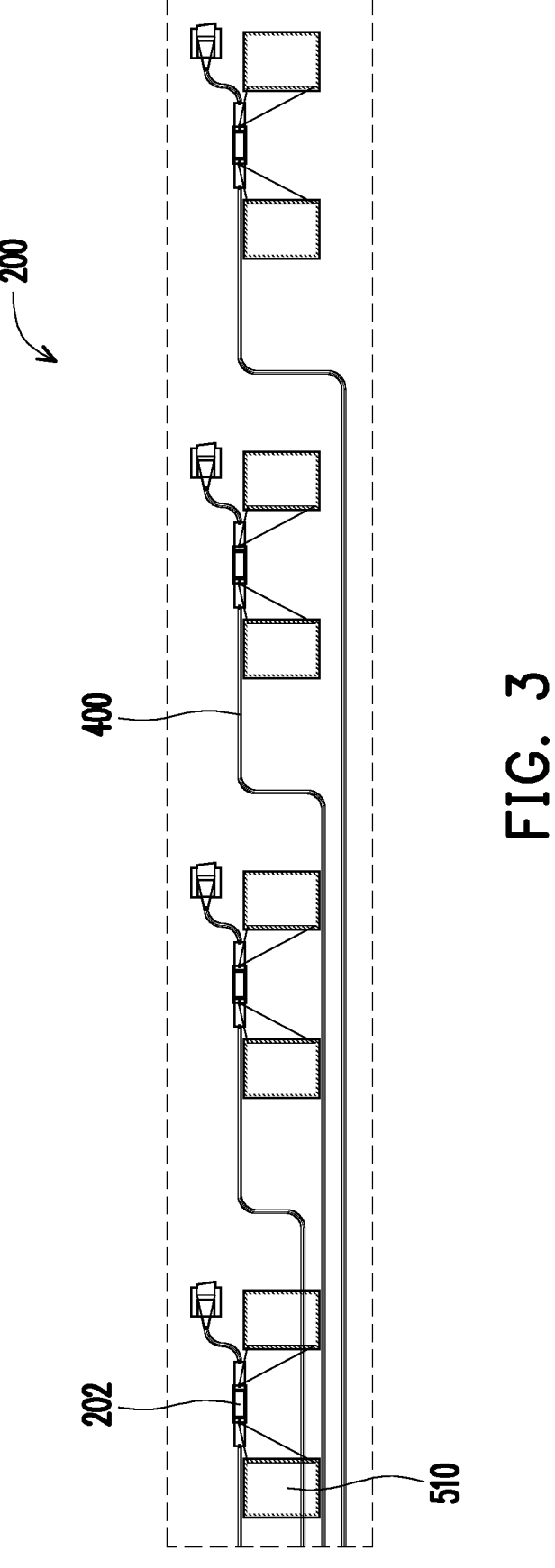
FIG. 3 is an enlarged view of the photodetector array of FIG. 1A.

FIG. 3 is an enlarged view of the photodetector array of FIG. 1A. Please refer to FIG. 1A, FIG. 1B, FIG. 2, and FIG. 3. In the embodiment, the photodetector array 200 is disposed next to the second side S2 of the empty area EA opposite to the first side S1. The photodetector array 200 includes a plurality of photodetectors 202 arranged in an array along the second side S2. The second grating couplers 104 are respectively coupled to the photodetectors 202. The number of the second grating couplers 104 is equal to the number of the photodetectors 202.

In the embodiment, the bonding pads 500 include a plurality of first bonding pads 510, a plurality of second bonding pads 520, a first ground bonding pad G1, a plurality of third bonding pads 530, a plurality of fourth bonding pads 540, a second ground bonding pad G2, a plurality of fifth bonding pads 550, and a third ground bonding pad G3. The aforementioned bonding pads 500 are dispersedly disposed around the empty area EA and arranged in an array along the third side S3, the second side S2, and the fourth side S4.

In the embodiment, the first bonding pads 510 are disposed next to the second side S2 and next to the photodetector array 200. The first bonding pads 510 are electrically connected to the photodetectors 202 for outputting the electrical signal ES from the photodetectors 202.

Figure 4:
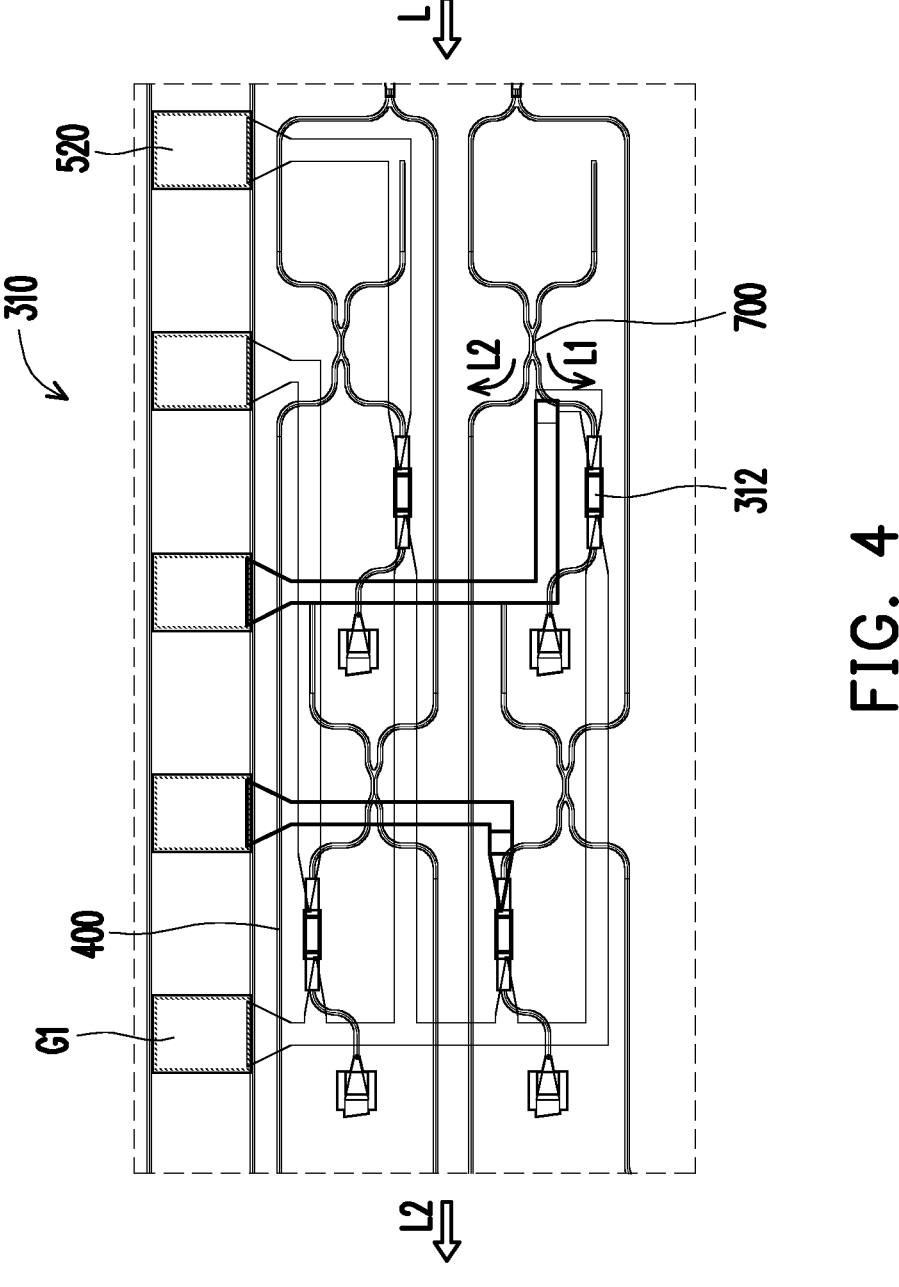
FIG. 4 is an enlarged view of the first photodetector array of FIG. 1A.

FIG. 4 is an enlarged view of the first photodetector array of FIG. 1A. Please refer to FIG. 1A, FIG. 1B, FIG. 2, and FIG. 4. In the embodiment, the optical modulator module 300 includes a first photodetector array 310, an optical modulator array 320, and a second photodetector array 330. The first photodetector array 310 is disposed next to the third side S3 of the empty area EA. The optical modulator array 320 is disposed next to the second side S2 of the empty area EA. The second photodetector array 330 is disposed next to the fourth side S4 of the empty area EA. (One end of) the first photodetector array 310 is coupled to the third grating couplers 106. (Another end of) the first photodetector array 310 is coupled to (one end of) the optical modulator array 320. (Another end of) the optical modulator array 320 is coupled to (one end of) the second photodetector array 330. (Another end of) the second photodetector array 330 is coupled to the fourth grating couplers 108. As shown in FIG. 1B, the light beam L includes a first light beam L1 and a second light beam L2. The first light beam L1 in the light beam L from the third grating couplers 106 is transmitted to the first photodetector array 310, and the second light beam L2 in the light beam L from the third grating couplers 106 is transmitted to the optical modulator array 320. The optical modulator array 320 receives and modulates the second light beam L2 to generate a third light beam L3. The third light beam L3 includes a fourth light beam L4 and a fifth light beam L5. The fourth light beam L4 in the third light beam L3 from the optical modulator array 320 is transmitted to the second photodetector array 330, and the fifth light beam L5 in the third light beam L3 from the optical modulator array 320 is transmitted to the fourth grating couplers 108.

In the embodiment, the photonic integrated circuit chip 10 further includes a plurality of optical splitters 600. The optical splitters 600 can be ½ multi-mode interference couplers, but the disclosure is not limited thereto. The optical splitters 600 are disposed next to the third side S3. The first photodetector array 310 includes a plurality of first photodetectors 312. The first photodetectors 312 are coupled to the third grating couplers 106 through the optical splitters 600. The light beam L from the third grating couplers 106 is first transmitted to the optical splitters 600 and then to the first photodetectors 312. The number of the third grating couplers 106 is equal to the number of the optical splitters 600, and the number of the first photodetectors 312 is greater than the number of the optical splitters 600.

In the embodiment, the photonic integrated circuit chip 10 further includes a plurality of first directional couplers (DC) 700. The first directional couplers 700 are disposed next to the third side S3. Each first directional coupler 700 is correspondingly disposed next to one of the first photodetectors 312. One end of each first directional coupler 700 is coupled to the optical splitters 600, and another end and still another end of each first directional coupler 700 are coupled to the corresponding first photodetectors 312 and the corresponding optical modulator array 320, respectively. The first directional couplers 700 are for splitting the light beam L into the first light beam L1 and the second light beam L2. The light intensity ratio of the first light beam L1 and the second light beam L2 after splitting is, for example, 5:95, but the disclosure is not limited thereto.

In the embodiment, the second bonding pads 520 and the first ground bonding pad G1 are disposed next to the first photodetector array 310. The second bonding pads 520 are respectively electrically connected to the first photodetectors 312, and the first ground bonding pad G1 is electrically connected to the first photodetectors 312. The number of the second bonding pads 520 is equal to the number of the first photodetectors 312. The second bonding pads 520 and the first ground bonding pad G1 are configured to be electrically connected to a controller CT, as shown in FIG. 1B, such that the controller CT can obtain the light intensity of the first light beam L1.

In an embodiment, the controller CT includes, for example, a central processing unit (CPU), a microprocessor, a digital signal processor (DSP), a programmable controller, a programmable logic device (PLD), or other similar devices, or a combination thereof, and the disclosure is not limited thereto. In addition, in an embodiment, each function of the controller CT can be implemented as multiple program codes. The program codes are stored in a memory unit and executed by the controller CT. Alternatively, in an embodiment, each function of the controller CT can be implemented as one or more circuits. The disclosure is not limited to using software or hardware to implement each function of the controller CT.

Figure 5:
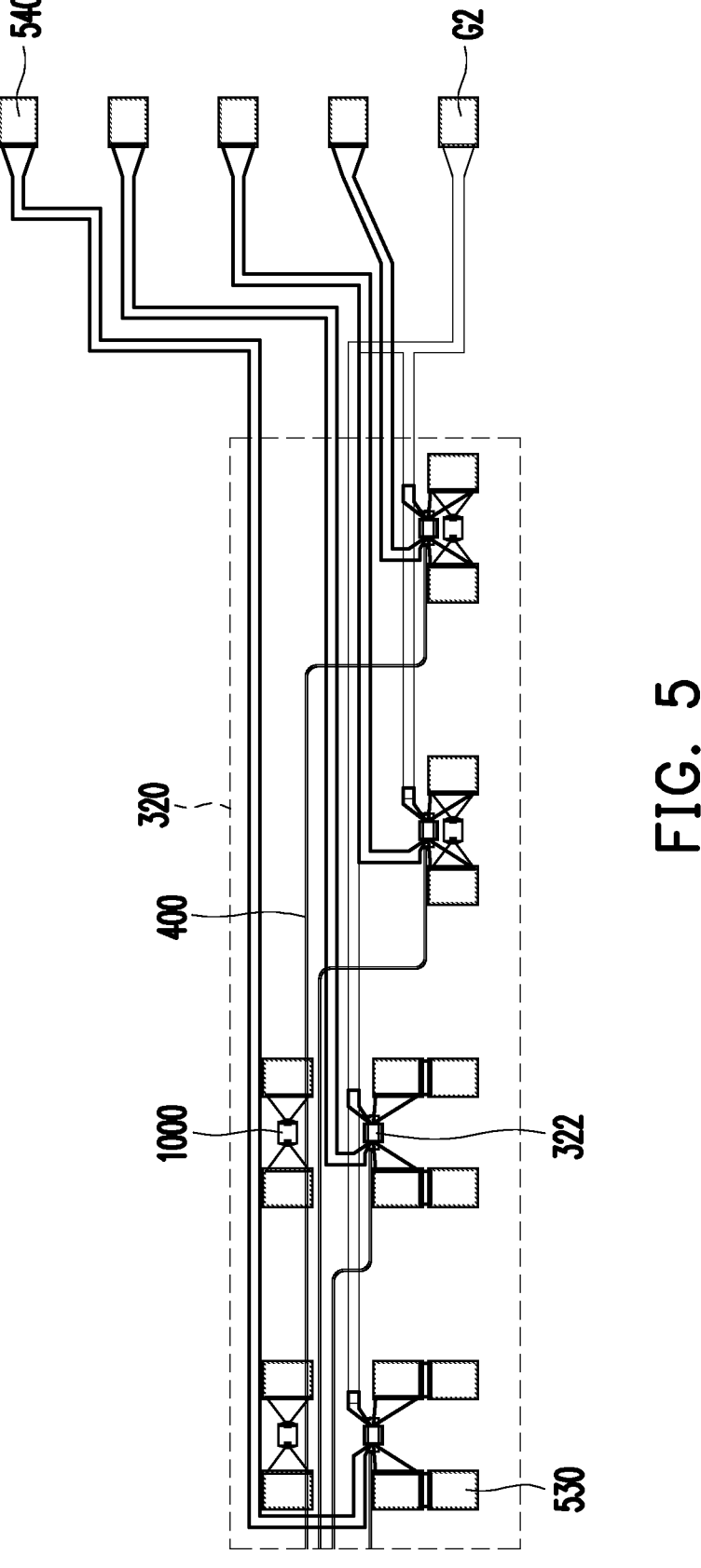
FIG. 5 is an enlarged view of the optical modulator array of FIG. 1A.
Figure 6:
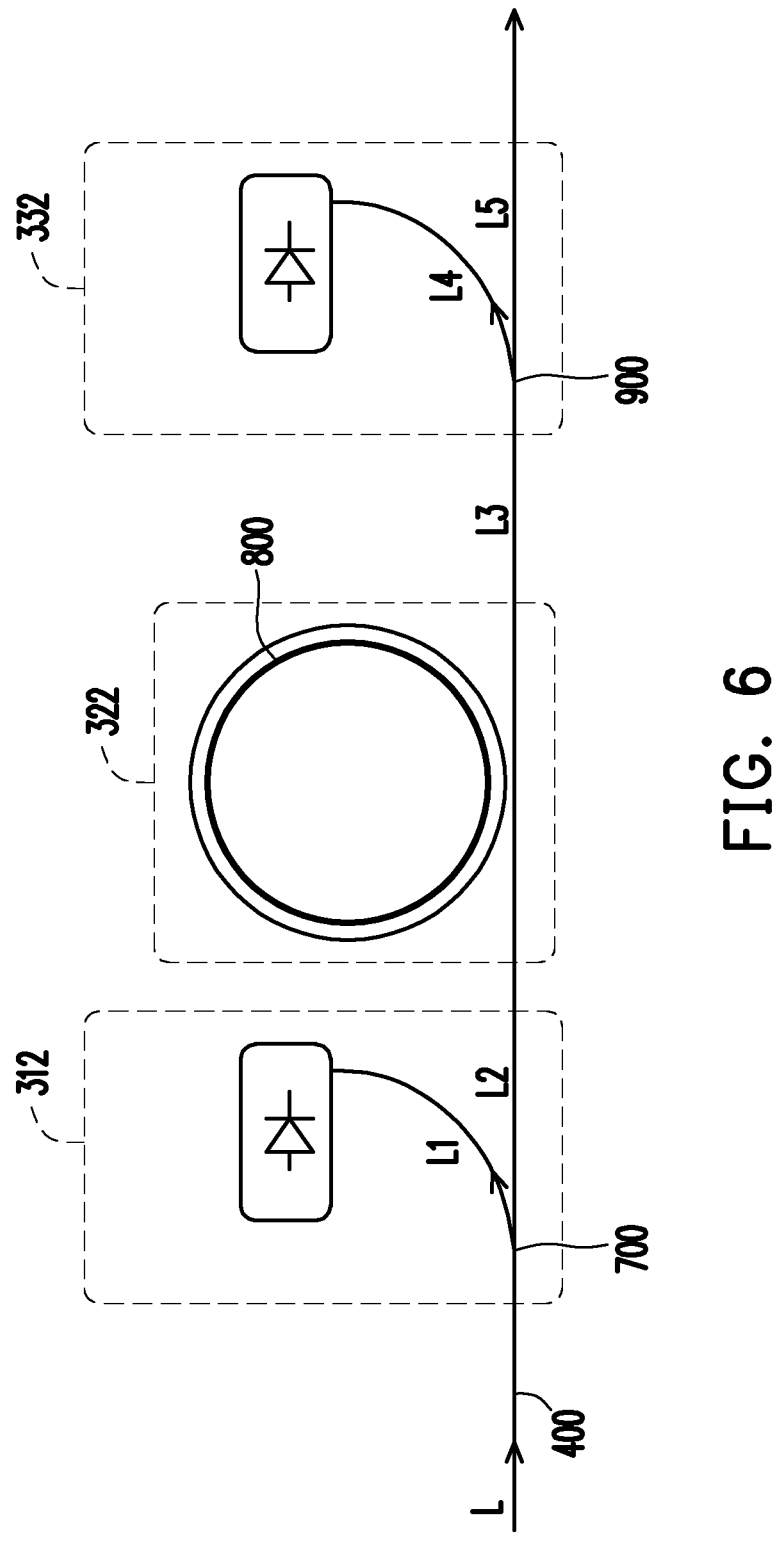
FIG. 6 is a schematic view of an example of an optical modulator in an optical modulator array of a photonic integrated circuit chip according to an embodiment of the disclosure.

FIG. 5 is an enlarged view of the optical modulator array of FIG. 1A. FIG. 6 is a schematic view of an example of an optical modulator in an optical modulator array of a photonic integrated circuit chip according to an embodiment of the disclosure. Please refer to FIG. 1A, FIG. 1B, FIG. 2, FIG. 5, and FIG. 6. In the embodiment, the photonic integrated circuit chip 10 further includes a plurality of heaters 800. The heaters 800 are disposed next to the second side S2. The optical modulator array 320 includes a plurality of optical modulators 322, and the heaters 800 are respectively correspondingly disposed next to the optical modulators 322. In an embodiment, the ranges of each heater 800 and the corresponding optical modulators 322 thereof on the substrate 20 overlap with each other, as shown in FIG. 6.

In the embodiment, the optical modulators 322 can be electric-optic modulators, such as micro ring modulators (MRMs) shown in FIG. 6. The third bonding pads 530 are disposed next to the optical modulator array 320 to be electrically connected to the optical modulators 322 and configured to receive a driving signal DS for driving the optical modulators 322 to generate the third light beam L3 after modulating the second light beam L2.

In the embodiment, the fourth bonding pads 540 and the second ground bonding pad G2 are disposed next to the fourth side S4 of the empty area EA. The fourth bonding pads 540 are respectively electrically connected to the heaters 800, and the second ground bonding pad G2 is electrically connected to the heaters 800. The fourth bonding pads 540 and the second ground bonding pad G2 are configured to be electrically connected to the controller CT such that the controller CT controls the temperatures of the optical modulators 322 through the heaters 800 to adjust the light intensity of the third light beam L3. The number of the heaters 800 is equal to the number of the optical modulators 322 and is equal to the number of the fourth bonding pads 540. In addition, since the signal for controlling the heaters 800 is not a high-speed signal, the positions of the fourth ground bonding pads 540 and the second ground bonding pad G2 connected to the heaters 800 are designed on the fourth side S4 instead of the second side S2, which can reduce the problem of the density of the bonding pads 500 being too high on the second side S2.

In addition, in the embodiment, the photonic integrated circuit chip 10 further includes a plurality of impedance matchers 1000 respectively disposed next to the optical modulators 322 and respectively electrically connected to the optical modulators 322. The impedance matchers 1000 are for matching the impedance values of the optical modulators 322. The impedance matchers 1000 are, for example, matching resistors. In an embodiment, the impedance matchers 1000 can include matching resistors and bonding wires electrically connected to the optical modulators 322.

Please refer to FIG. 1A, FIG. 1B, and FIG. 2. In the embodiment, the second photodetector array 330 includes a plurality of second photodetectors 332. The fourth grating couplers 108 are respectively coupled to the second photodetectors 332. The number of the fourth grating couplers 108 is equal to the number of the second photodetectors 332.

In the embodiment, the photonic integrated circuit chip 10 further includes a plurality of second directional couplers 900. Similar to the first directional couplers 700, the second directional couplers 900 are disposed next to the fourth side S4. Each second directional coupler 900 is correspondingly disposed next to one of the second photodetectors 332. One end of each second directional coupler 900 is coupled to the optical modulator array 320, and another end and still another end of each second directional coupler 900 are coupled to the corresponding second photodetectors 332 and the corresponding fourth grating couplers 108, respectively. The second directional couplers 900 are for splitting the third light beam L3 from the optical modulator array 320 into the fourth light beam L4 and the fifth light beam L5. The light intensity ratio of the fourth light beam L4 and the fifth light beam L5 after splitting is, for example, 5:95, but the disclosure is not limited thereto.

In the embodiment, the fifth bonding pads 550 and the third ground bonding pad G3 are disposed next to the second photodetector array 330. The fifth bonding pads 550 are respectively electrically connected to the second photodetectors 332, and the third ground bonding pad G3 is electrically connected to the second photodetectors 332. The number of the fifth bonding pads 550 is equal to the number of the second photodetectors 332. The fifth bonding pads 550 and the third ground bonding pad G3 are configured to be electrically connected to the controller CT such that the controller CT obtains the light intensity of the fourth light beam L4.

In the embodiment, the controller CT adjusts the light intensity of the third light beam L3 according to the ratio between the light intensity of the fourth light beam L4 and the light intensity of the first light beam L1.

Based on the above, in an embodiment of the disclosure, the photonic integrated circuit chip 10 includes the grating coupler array 100, the photodetector array 200, the optical modulator module 300, the optical waveguides 400, and the bonding pads 500. The photodetector array 200 is designed as a signal receiving end to be coupled to the grating coupler array 100 to convert the light signal LS from the grating coupler array 100 into the electrical signal ES. The optical modulator module 300 is designed as a signal transmitting end to be coupled to the grating coupler array 100 to modulate the light beam L from the grating coupler array 100 such that light of a specific wavelength in the light beam L is output from the grating coupler array 100. Therefore, the photonic integrated circuit chip 10 integrates the signal receiving end and the signal transmitting end into one module through a simple design. FIG. 1A illustrates that the photodetector array 200 includes four groups of photodetectors 202, and the optical modulator module 300 includes four groups of optical modulators 322. That is to say, the photodetector array 200 forms a four-channel signal receiving end, and the optical modulator module 300 forms a four-channel signal transmitting end. However, the disclosure does not limit the number of the photodetectors 202 and the number of the optical modulators 322.

Furthermore, in an embodiment, the photonic integrated circuit chip 10 further includes the heaters 800. Furthermore, the optical modulator module 300 includes a first photodetector array 310, an optical modulator array 320, and a second photodetector array 330. The controller CT obtains the light intensity of the first light beam L1 from the first photodetector array 310 and the light intensity of the fourth light beam L4 from the second photodetector array 330 through the bonding pads 500. The controller CT controls the temperature of the optical modulator array 320 through the heaters 800 according to the ratio between the light intensity of the fourth light beam L4 and the light intensity of the first light beam L1 to adjust the light intensity of the third light beam L3 such that the optical modulator array 320 adjusts the wavelength range of the passing light for the fifth light beam L5 to output the correct wavelength. That is to say, by monitoring the light intensity of the first light beam L1 at the input end and the light intensity of the fourth light beam L4 at the output end, it can be determined whether the fifth light beam L5 meets the correct wavelength. When the wavelength of the fifth light beam L5 is not the correct light wavelength, for example, the system ambient temperature changes, and then the temperature of the optical modulator array 320 can be controlled through the heaters 800 to control the third light beam L3 at the corresponding light intensity such that the fifth light beam L5 can output the correct wavelength. Therefore, the optical modulator module 300 can form a monitoring and compensation system in conjunction with the heaters 800, which can increase the stability of the system.

In addition, in an embodiment, the photonic integrated circuit chip 10 further includes the plurality of impedance matchers 1000 electrically connected to the optical modulators 322. Therefore, the dispositions of the impedance matchers 1000 avoid the problem of energy reflection of the input signal caused by impedance mismatch, thereby optimizing the performance of the system.

Figure 7:
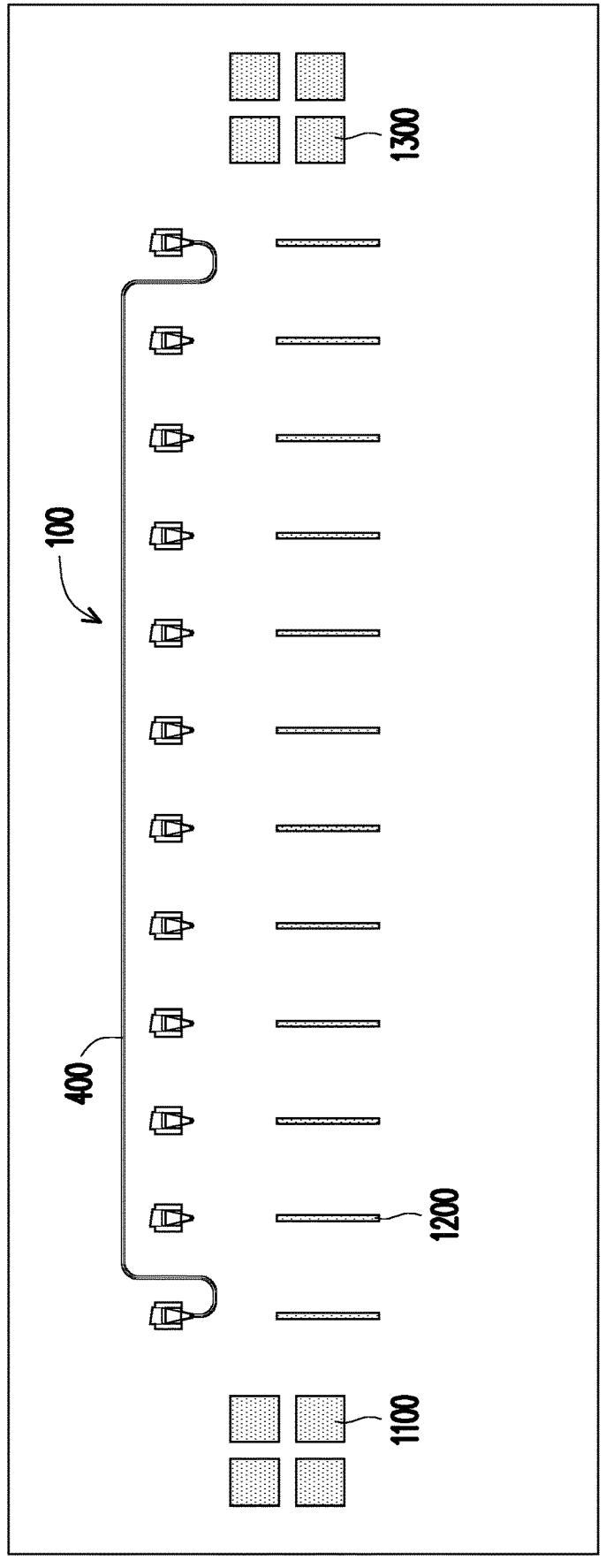
FIG. 7 is an enlarged view of a photonic integrated circuit chip in a grating coupler array according to another embodiment of the disclosure.

FIG. 7 is an enlarged view of a photonic integrated circuit chip in a grating coupler array according to another embodiment of the disclosure. Please refer to FIG. 7. In the embodiment, the photonic integrated circuit chip further includes a plurality of first alignment keys 1100, a plurality of second alignment keys 1200, and a plurality of third alignment keys 1300 disposed next to the first side S1 of the empty area EA. The first alignment keys 1100 and the third alignment keys 1300 are both arranged in a 2×2 matrix, and the second alignment keys 1200 are arranged in a 1×12 matrix along the first side S1.

In the embodiment, the first alignment keys 1100 are disposed at one end of the grating coupler array 100, and the third alignment keys 1300 are disposed at another end of the grating coupler array 100 opposite to the one end. The second alignment keys 1200 are disposed between the first alignment keys 1100 and the third alignment keys 1300 and respectively aligned with the first grating coupler 102, the second grating couplers 104, the third grating couplers 106, the fourth grating couplers 108, and the fifth grating coupler 110.

Figure 8:
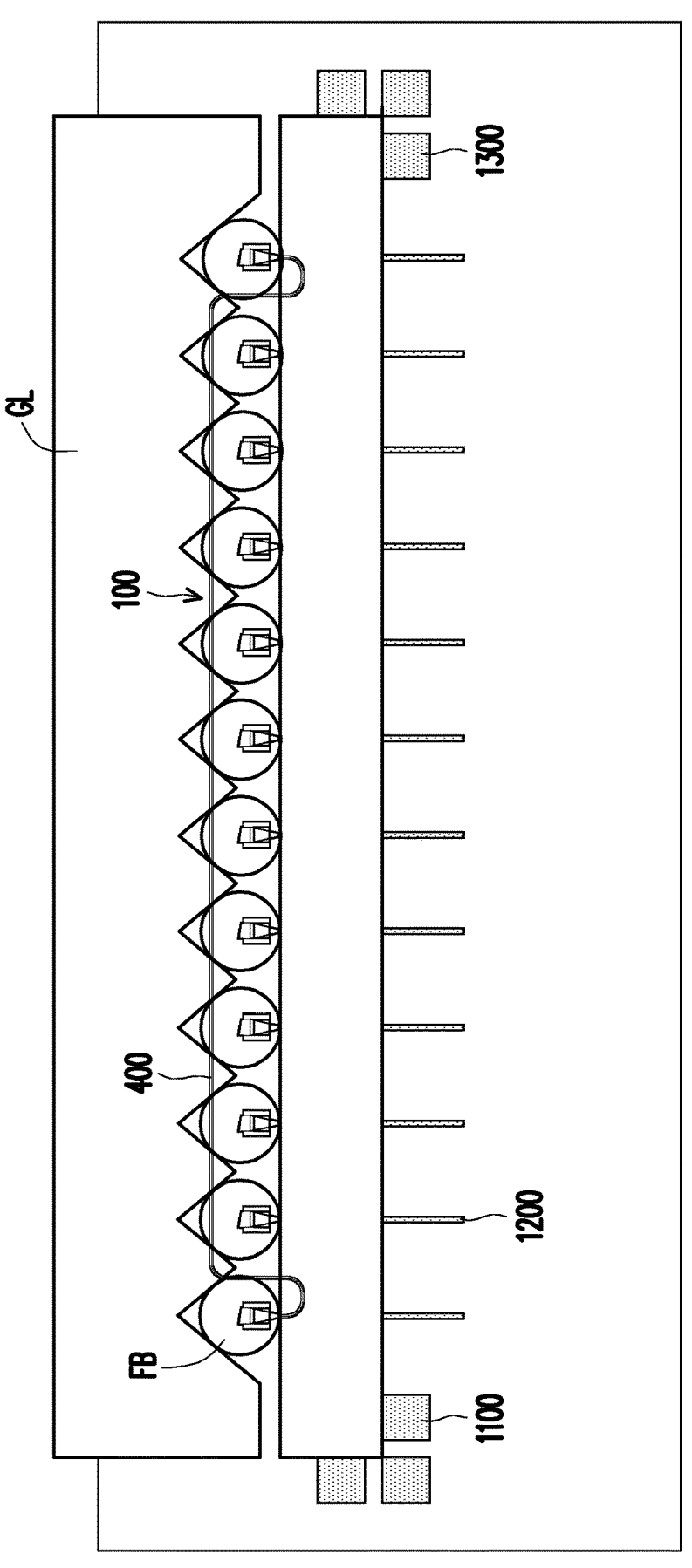
FIG. 8 is a schematic view of FIG. 7 coupled to an optical fiber array.

FIG. 8 is a schematic view of FIG. 7 coupled to an optical fiber array. Please refer to FIG. 8. In the embodiment, the grating coupler array 100 is configured to be coupled to the (external) optical fiber array FB. The optical fiber array FB can be sandwiched in a glass piece GL. The grating coupler array 100 receives the light beam L, the light signal LS, and the alignment light beam AL through the optical fiber array FB, and outputs the output light beam OL, as shown in FIG. 2. The first alignment keys 1100, the second alignment keys 1200, and the third alignment keys 1300 are configured to assist the coupling of the optical fiber array FB and the grating coupler array 100 when the grating coupler array 100 is coupled to the optical fiber array FB. The ratio between the output light beam OL and the alignment light beam AL determines the coupling efficiency between the optical fiber array FB and the grating coupler array 100. That is to say, optical methods (such as camera shooting) are used to initially determine whether the optical fiber array FB is correctly aligned on the alignment key, and then the loop-back optical path formed by the coupling of the first grating coupler 102 and the fifth grating coupler 110 is used to confirm whether the optical fiber array FB is coupled at the correct position. Therefore, compared with the traditional method of having to compare each input end and output end, the photonic integrated circuit chip of the embodiment of the disclosure can simplify the alignment process.

Figure 9:
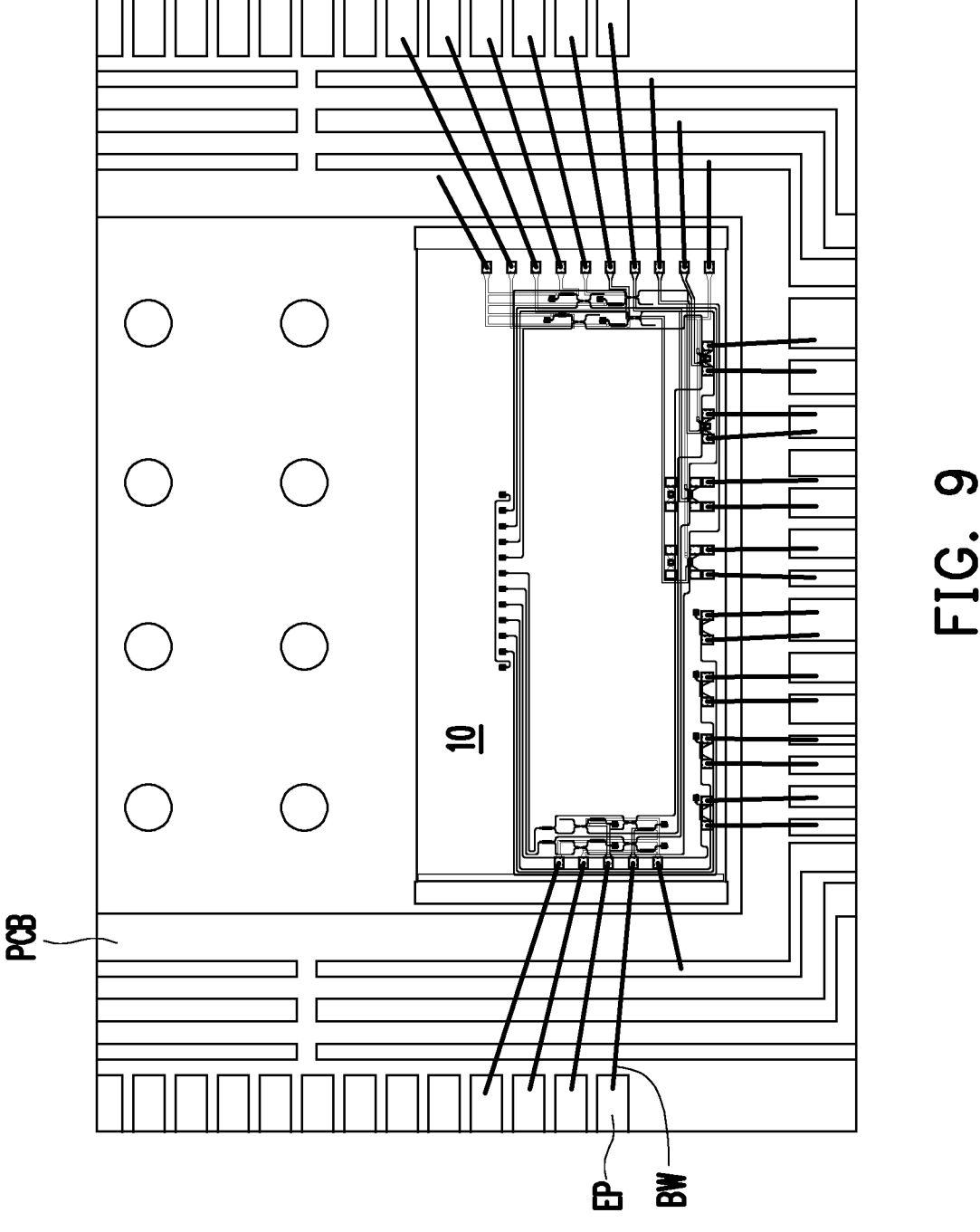
FIG. 9 is a schematic view of a connection between a photonic integrated circuit chip and a circuit board according to an embodiment of the disclosure.

FIG. 9 is a schematic view of a connection between a photonic integrated circuit chip and a circuit board according to an embodiment of the disclosure. Please refer to FIG. 9. In the embodiment, the photonic integrated circuit chip 10 is configured to be electrically connected to a circuit board PCB. The photonic integrated circuit chip 10 is electrically connected to electrical pads EP of the circuit board PCB through the bonding pads 500 to output the electrical signal ES and receive the driving signal DS for driving the optical modulator module 300. In an embodiment, the circuit board PCB is electrically connected to the controller CT or the circuit board PCB includes the controller CT. Therefore, the controller CT can respectively obtain the light intensity of the first light beam L1 from the first photodetector array 310 and the light intensity of the fourth light beam L4 from the second photodetector array 330 such that the controller CT can adjust the light intensity of the third light beam L3 through the heaters 800 according to the ratio between the light intensity of the fourth light beam L4 and the light intensity of the first light beam L1.

Based on the above, in the photonic integrated circuit chip 10 according to an embodiment of the disclosure, since the positions of the bonding pads 500 are designed to be dispersedly disposed around the empty area EA, bonding wires BW can be easily connected to the bonding pads 500 of the photonic integrated circuit chip 10 and the electrical pads EP of the circuit board PCB, thereby reducing the difficulty of integrating the photonic integrated circuit chip 10 with the circuit board PCB. As shown in FIG. 9, the lengths of adjacent bonding wires BW are approximately the same, and there is no staggered high and low situation. In addition, the bonding pads 500 includes the first ground bonding pad G1, the second ground bonding pad G2, and the third ground bonding pad G3 that are designed to be commonly grounded. Therefore, the number of the bonding pads 500 can be reduced, thereby reducing the density of the bonding pads 500. In this way, the placement spacing of components can be increased and space for wire bonding can be provided to avoid electrical losses caused by packaging which can affect component characteristics.

To sum up, in an embodiment of the disclosure, the photonic integrated circuit chip includes the grating coupler array, the photodetector array, the optical modulator module, the optical waveguide, and the bonding pad. The photodetector array is designed as a signal receiving end to be coupled to the grating coupler array to convert the light signal from the grating coupler array into an electrical signal. The optical modulator module is designed as a signal transmitting end to be coupled to the grating coupler array to modulate the light beam from the grating coupler array such that light of a specific wavelength in the light beam is output from the grating coupler array. Therefore, the photonic integrated circuit chip integrates the signal receiving end and the signal transmitting end into one module through a simple design.

Furthermore, in an embodiment, the photonic integrated circuit chip further includes the heater. Furthermore, the optical modulator module includes the first photodetector array, the optical modulator array, and the second photodetector array. The controller obtains the light intensity of the first light beam from the first photodetector array and the light intensity of the fourth light beam from the second photodetector array through the bonding pad. The controller controls the temperature of the optical modulator array through the heater according to the ratio between the light intensity of the fourth light beam and the light intensity of the first light beam to adjust the light intensity of the third light beam. By monitoring the light intensity of the first light beam at the input end and the light intensity of the fourth light beam at the output end, it can be determined whether the fifth light beam meets the correct wavelength, and then the temperature of the optical modulator array can be controlled through the heater to control the third light beam at the corresponding light intensity, so that the fifth light beam is at the correct wavelength.

Therefore, the optical modulator module can form a monitoring and compensation system in conjunction with the heater, which can increase the stability of the system.

What is claimed is:

1. A photonic integrated circuit chip, having an empty area, wherein the photonic integrated circuit chip comprises:
   a grating coupler array, configured to receive a light beam and a light signal;
   a photodetector array, coupled to the grating coupler array, and configured to convert the light signal from the grating coupler array into an electrical signal;
   an optical modulator module, coupled to the grating coupler array, and configured to modulate the light beam from the grating coupler array such that light of a specific wavelength in the light beam is output from the grating coupler array;
   a plurality of optical waveguides, wherein the optical modulator module and the photodetector array are coupled to the grating coupler array through the optical waveguides; and
   a plurality of bonding pads, electrically connected to the optical modulator module and the photodetector array, wherein the grating coupler array, the photodetector array, the optical modulator module, the optical waveguides, and the bonding pads are disposed around the empty area along a plurality of sides of the empty area.

2. The photonic integrated circuit chip according to claim 1, wherein the photonic integrated circuit chip is configured to be electrically connected to a circuit board, wherein the photonic integrated circuit chip is electrically connected to electrical pads of the circuit board through the bonding pads to output the electrical signal and receive a driving signal for driving the optical modulator module.

3. The photonic integrated circuit chip according to claim 1, wherein the grating coupler array is disposed next to a first side of the empty area and comprises a first grating coupler, a plurality of second grating couplers, a plurality of third grating couplers, a plurality of fourth grating couplers, and a fifth grating coupler sequentially arranged in an array along the first side.

4. The photonic integrated circuit chip according to claim 3, wherein the photodetector array is disposed on a second side of the empty area opposite to the first side, and the photodetector array comprises a plurality of photodetectors arranged in an array along the second side, wherein the second grating couplers are respectively coupled to the photodetectors, wherein a number of the second grating couplers is equal to a number of the photodetectors.

5. The photonic integrated circuit chip according to claim 4, wherein the bonding pads comprise a plurality of first bonding pads, and the first bonding pads are disposed next to the photodetector array to be electrically connected to the photodetectors and configured to output the electrical signal from the photodetectors.

6. The photonic integrated circuit chip according to claim 3, wherein the optical modulator module comprises a first photodetector array, an optical modulator array, and a second photodetector array, wherein the first photodetector array is disposed on a third side of the empty area adjacent to the first side, the optical modulator array is disposed next to a second side of the empty area opposite to the first side, the second side is adjacent to the third side, and the second photodetector array is disposed next to a fourth side of the empty area adjacent to the first side and the second side, wherein the third grating couplers are coupled to one end of the first photodetector array, another end of the first photodetector array is coupled to one end of the optical modulator array, another end of the optical modulator array is coupled to one end of the second photodetector array, and another end of the second photodetector array is coupled to the fourth grating couplers, wherein the light beam comprises a first light beam and a second light beam, the first light beam in the light beam from the third grating couplers is transmitted to the first photodetector array, the second light beam in the light beam from the third grating couplers is transmitted to the optical modulator array, and the optical modulator array receives and modulates the second light beam to generate a third light beam, wherein the third light beam comprises a fourth light beam and a fifth light beam, the fourth light beam in the third light beam from the optical modulator array is transmitted to the second photodetector array, and the fifth light beam in the third light beam from the optical modulator array is transmitted to the fourth grating couplers.

7. The photonic integrated circuit chip according to claim 6, further comprising a plurality of optical splitters, wherein the optical splitters are disposed next to the third side, the first photodetector array comprises a plurality of first photodetectors, and the first photodetectors are coupled to the third grating couplers through the optical splitters, wherein the light beam from the third grating couplers is first transmitted to the optical splitters and then transmitted to the first photodetectors, wherein a number of the third grating couplers is equal to a number of the optical splitters, and a number of the first photodetectors is greater than the number of the optical splitters.

8. The photonic integrated circuit chip according to claim 7, further comprising a plurality of first directional couplers, wherein the first directional couplers are disposed next to the third side, each first directional coupler is correspondingly disposed next to one of the first photodetectors, one end of each first directional coupler is coupled to the optical splitters, and another end and still another end of each first directional coupler are coupled to the corresponding first photodetector and the corresponding optical modulator array, respectively, wherein the first directional couplers are configured to split the light beam into the first light beam and the second light beam.

9. The photonic integrated circuit chip according to claim 7, wherein the bonding pads comprise a plurality of second bonding pads and a first ground bonding pad, the second bonding pads and the first ground bonding pad are disposed next to the first photodetector array, the second bonding pads are respectively electrically connected to the first photodetectors, and the first ground bonding pad is electrically connected to the first photodetectors, wherein a number of the second bonding pads is equal to the number of the first photodetectors, wherein the second bonding pads and the first ground bonding pad are configured to be electrically connected to a controller such that the controller obtains a light intensity of the first light beam.

10. The photonic integrated circuit chip according to claim 6, further comprising a plurality of heaters, wherein the heaters are disposed next to the second side, the optical modulator array comprises a plurality of optical modulators, and the heaters are respectively correspondingly disposed next to the optical modulators.

11. The photonic integrated circuit chip according to claim 10, wherein the bonding pads comprise a plurality of third bonding pads, a plurality of fourth bonding pads, and a second ground bonding pad, the third bonding pads are disposed next to the optical modulator array to be electrically connected to the optical modulators and configured to receive a driving signal for driving the optical modulators to generate the third light beam after modulating the second light beam.

12. The photonic integrated circuit chip according to claim 11, wherein the fourth bonding pads and the second ground bonding pad are disposed next to the fourth side of the empty area, the fourth bonding pads are respectively electrically connected to the heaters, and the second ground bonding pad is electrically connected to the heaters, wherein the fourth bonding pads and the second ground bonding pad are configured to be electrically connected to a controller such that the controller controls temperatures of the optical modulators through the heaters to adjust a light intensity of the third light beam, wherein a number of the heaters is equal to a number of the optical modulators and is equal to a number of the fourth bonding pads.

13. The photonic integrated circuit chip according to claim 10, further comprising a plurality of impedance matchers respectively disposed next to the optical modulators and respectively electrically connected to the optical modulators.

14. The photonic integrated circuit chip according to claim 6, wherein the second photodetector array comprises a plurality of second photodetectors, wherein the fourth grating couplers are respectively coupled to the second photodetectors, wherein a number of the fourth grating couplers is equal to a number of the second photodetectors.

15. The photonic integrated circuit chip according to claim 14, further comprising a plurality of second directional couplers, wherein the second directional couplers are disposed next to the fourth side, each second directional coupler is correspondingly disposed next to one of the second photodetectors, one end of each second directional coupler is coupled to the optical modulator array, and another end and still another end of each second directional coupler are respectively coupled to the corresponding second photodetector and the corresponding fourth grating couplers, wherein the second directional couplers are configured to split the third light beam from the optical modulator array into the fourth light beam and the fifth light beam.

16. The photonic integrated circuit chip according to claim 15, wherein the bonding pads comprise a plurality of fifth bonding pads and a third ground bonding pad, the fifth bonding pads and the third ground bonding pad are disposed next to the second photodetector array, the fifth bonding pads are respectively electrically connected to the second photodetectors, and the third ground bonding pad is electrically connected to the second photodetectors, wherein a number of the fifth bonding pads is equal to the number of the second photodetectors, wherein the fifth bonding pads and the third ground bonding pad are configured to be electrically connected to a controller such that the controller obtains a light intensity of the fourth light beam.

17. The photonic integrated circuit chip according to claim 16, wherein the controller adjusts a light intensity of the third light beam according to a ratio between the light intensity of the fourth light beam and a light intensity of the first light beam.

18. The photonic integrated circuit chip according to claim 3, wherein the first grating coupler is coupled to the fifth grating coupler through one of the optical waveguides to form a loopback optical path, wherein one of the first grating coupler and the fifth grating coupler is configured to receive an alignment beam, and the alignment beam is transmitted to the other one of the first grating coupler and the fifth grating coupler through the one of the optical waveguides to generate an output beam.

19. The photonic integrated circuit chip according to claim 18, further comprising a plurality of first alignment keys, a plurality of second alignment keys, and a plurality of third alignment keys disposed next to the first side of the empty area, wherein the first alignment keys are disposed at one end of the grating coupler array, the third alignment keys are disposed at another end of the grating coupler array opposite to the one end, and the second alignment keys are disposed between the first alignment keys and the third alignment keys and respectively aligned with the first grating coupler, the second grating couplers, the third grating couplers, the fourth grating couplers, and the fifth grating coupler, wherein the grating coupler array is configured to be coupled to an optical fiber array, wherein a ratio between the output beam and the alignment beam determines a coupling efficiency between the optical fiber array and the grating coupler array.

20. A photonic integrated circuit chip, having an empty area, wherein the photonic integrated circuit chip comprises:

a grating coupler array, configured to receive a light beam;

an optical modulator module, coupled to the grating coupler array, and configured to modulate the light beam from the grating coupler array such that light of a specific wavelength in the light beam is output from the grating coupler array;

a plurality of optical waveguides, wherein the optical modulator module is coupled to the grating coupler array through the optical waveguides;

a plurality of heaters, electrically connected to the optical modulator module; and a plurality of bonding pads, electrically connected to the optical modulator module and the heaters, wherein the grating coupler array, the optical modulator module, the optical waveguides, the heaters, and the bonding pads are disposed around the empty area, wherein the optical modulator module comprises a first photodetector array, an optical modulator array, and a second photodetector array, wherein the light beam comprises a first light beam and a second light beam, the first light beam is transmitted to the first photodetector array, the second light beam is transmitted to the optical modulator array, the optical modulator array receives and modulates the second light beam to generate a third light beam, the third light beam comprises a fourth light beam and a fifth light beam, the fourth light beam is transmitted to the second photodetector array, and the fifth light beam is transmitted to the grating coupler array, wherein the heaters are disposed in the optical modulator array, wherein the bonding pads are configured to be electrically connected to a controller such that the controller obtains a light intensity of the first light beam and a light intensity of the fourth light beam, and the controller controls a temperature of the optical modulator array through the heaters according to a ratio between the light intensity of the fourth light beam and the light intensity of the first light beam to adjust a light intensity of the third light beam.

* * * * *